United States Patent
Lo et al.

(12) 
(10) Patent No.: US 6,268,927 B1
(45) Date of Patent: Jul. 31, 2001

(54) COMPUTER-RELATED FORM OVERLAY METHOD AND APPARATUS

(75) Inventors: Robin Lo, Saratoga; Iwao Max Anzai, Mountain View; Kristen A. McIntyre, Fremont; Tom Chen, Sunnyvale, all of CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/103,561

(22) Filed: Jun. 24, 1998

Related U.S. Application Data

(60) Provisional application No. 60/065,883, filed on Nov. 17, 1997.

(51) Int. Cl.[7] .................................................. G06F 15/00
(52) U.S. Cl. .......................................... 358/1.15; 358/1.9
(58) Field of Search ................................. 358/1.14, 1.15, 358/1.16, 1.17, 1.18, 1.9

(56) References Cited

U.S. PATENT DOCUMENTS

| | | | |
|---|---|---|---|
| 5,349,648 | 9/1994 | Handley | 395/148 |
| 5,813,020 | * 9/1998 | Hohensee et al. | 707/515 |
| 5,982,994 | * 11/1999 | Mori et al. | 395/114 |

FOREIGN PATENT DOCUMENTS

WO 96/22573   7/1996   (WO) .

* cited by examiner

Primary Examiner—Joseph Mancuso
Assistant Examiner—Douglas Tran
(74) Attorney, Agent, or Firm—Oblon, Spivak, McClelland, Maier & Neustadt, P.C.

(57) ABSTRACT

A method and apparatus for overlaying a data image on a form image includes a form enhancement module that interfaces to a PostScript driver and a forms overlay plug in module. A forms overlaying utility is included that stores and manages encapsulated PostScript files of form images on a mass storage device connected to a printer. The method and apparatus also includes combining the data file also encoded, albeit in a standard PostScript format, with the image file of the form so as to provide a composite output form that is printed from the printer without having to download the form via the computer to the printer each time the form is to be completed. To this end, the method and apparatus includes the forms overlaying module that inserts particular PostScript commands into a print job stream produced by an Adobe PostScript (PS) driver executing the data page description so as to call the encapsulated PostScript form image file from the printer hard disk and correctly combine it with the PostScript data file for printing.

9 Claims, 9 Drawing Sheets

Change of Address Card

| FIRST NAME | MI | LAST NAME |

OLD: ADDRESS

| COMPANY |
| ADDRESS1 |
| ADDRESS2 |
| CITY | STATE | ZIP |

NEW: ADDRESS

| COMPANY |
| ADDRESS1 |
| ADDRESS2 |
| CITY | STATE | ZIP |

*FIG. 1*

Change of Address Card

MARY | B | SMITH
FIRST NAME | MI | LAST NAME

OLD: ADDRESS

UNITED CORPORATION
COMPANY

1234 MAIN STREET
ADDRESS1

ADDRESS2

ANYTOWN | CA | 12345-1234
CITY | STATE | ZIP

NEW: ADDRESS

A COMPANY LTD
COMPANY

5678 PARK ROAD
ADDRESS1

ADDRESS2

NEW CITY | WA | 45678-2345
CITY | STATE | ZIP

*FIG. 2*

COMPUTER-RELATED FORM OVERLAY METHOD AND APPARATUS

CROSS-REFERENCE TO RELATED APPLICATIONS

The present application claims the benefit of and contains subject matter related to that disclosed in commonly owned, U.S. provisional application Ser. No. 60/065,883 filed on Nov. 17, 1997, the contents of which is incorporated herein by reference.

BACKGROUND OF THE INVENTION

1. Field of the Invention

The present invention pertains to computer-related image forming methods and apparatuses that print images corresponding to image files, such as page descriptions, stored on a computer readable medium. More particularly, the present invention is directed to printing methods and apparatuses that combine a data image with an image of a form, such as a business form that is stored in memory on the printer, where the data image and image of the form are encoded in industry standard printer language commands. During a print operation, the data image is aligned with the image of the form, much like how conventional blank business forms are completed with typewritten data, and printed as a composite image on an image holding medium, such as paper, overhead transparencies, and the like.

2. Discussion of the Background

The trend in modern business operations it toward automation, however most business operations still rely on standard business forms in day-to-day operations. FIG. 1 shows an example form that is commonly completed by hand. Using modern software such forms may be completed via computer assistance by displaying an image of the form on a display and entering data in specific fields of the form by way of a keyboard, mouse or other data input device. Once the computer-based form is completed, an operator prints the completed form, with the data input thereon, by downloading the form and data to a printer so as to obtain a completed hard-copy (see, e.g., FIG. 2).

In some cases, the computer-based form may be relatively complex and include lines, text, graphics, shading or the like. Conventional standard printer languages, such as PostScript or printer control language (PCL), help to resolve the complexity and inefficiencies of downloading large amounts of graphics data, on a pixel-by-pixel basis, by converting the graphics information into printer commands that are recognizable and interpreted by the printer. Accordingly, due to the large market presence of printers that are compatible with standard printer languages, the present inventors have identified that the most commercially valuable printer utilities and applications will be compatible with the standard printer languages. Custom printer packages simply do not have broad commercial appeal.

As identified by the present inventors, the form information can often be very large, even if encoded in a standard printer language, but the data information used to complete the forms is generally relatively small. Thus much of the time required to download and print the completed form is dedicated to the repeated downloading of the form information. Aside from being time inefficient, repeated printing of the form places significant communications capacity demands on the link between the computer and the printer, which is particularly troublesome when the computer is connected to the printer via a network.

Some conventional printers, such as laser printers, include a mass storage device, such as a hard disk, semiconductor memory, or other memory used for storing font information and graphics files such as logos. Retrieving and using this graphics information is handled seamlessly by the standard printer driver, such as a PostScript printer driver, employed in the computer because the content of the graphics information is predetermined and can thus be accounted for in the printer driver. However, as will be discussed and as identified by the present inventors, conventional utilities are not available for downloading large image files (such as templates of forms) to be stored in the printer, and standard printer drivers are not available for making use of the large image files with a PostScript description of the data image (to be overlaid on the form). As currently identified, a risk with combining the large image file with the data image is that the large image file will leave its markings on a frame buffer, the contents of which will be printed by the printer, and the markings will adversely affect a graphics and execution state of a PostScript interpreter. Moreover, the large image file may instill an adverse lasting effect that impacts other print operations because the large graphics files changes a graphics state and execution state of the PostScript interpreter.

U.S. Pat. No. 5,050,101 describes another printing apparatus that includes a memory which stores several types of form information in a custom format. Because the information is encoded in a custom format, the printing apparatus is not compatible with standard printing languages, and thus could not use a standard PostScript printer driver, for example. In this apparatus, respective data sets are cataloged with certain, application unique, "delimiter codes" that are used to arrange information stored in the printer memory, and later used to construct a composite image. The unique codes are then used to arrange the respective data sets into composite images which are then printed, by way of a custom interpreter.

As recognized by the present inventors, the above described printing apparatus relies on unique commands that are not compatible with other standard printer languages, such as PostScript, and thus, could not be conveniently used with various applications operating under commonly used operating systems such as WINDOWS 95 or WINDOWS 3.1, for example.

U.S. Pat. No. 4,944,614 describes a form overlaying type printing apparatus in which image data (which may be representative of a form) is downloaded to a printer at the same time as other data. The printer includes an input control section that distinguishes the image data from the other data and separately stores the respective data in different memories. Subsequently, only variable data are input to the printer from the computer, and the printer constructs respective composite images by retreiving selected portions of stored image and other data according to the variable data.

As recognized by the present inventors, conventional devices do not encode the image file and form data in a standard printer description design language such as PostScript so that the forms may be employed by all standard application software and printers that support the PostScript printer language. For a general description regarding PostScript language, see, e.g. Adobe Systems Incorporated, "PostScript Language Reference Manual", Addison-Wesley Publishing Company, Inc., Second Edition, 1990, and McGilton, et al, "PostScript by Example", Addison-Wesley Publishing Company, Inc., 1992, the entire contents of both of which are incorporated herein by reference.

Aside from print "overlaying" applications that use unique approaches to encoding data, several variants of standard printer description languages are available for encoding images, but the present inventors have determined that most standard printer description languages do not support mass storage device access as a standard feature. PCL is an example of a standard printing language that does not meet this criteria. In contrast to PostScript, which is a recognized exception, the other standard printer description languages fail to take advantage of the synergism between standard, and thus broadly applicable, printer design languages, and the use of file management features that enable the operator to organize and maintain form files on the printer's mass storage devices such as a hard disk, optical disk, or semiconductor memory bank, for example.

SUMMARY OF THE INVENTION

Accordingly, one object of the present invention is to provide a novel computer-based method and apparatus the overcomes the above-described limitations of conventional methods and apparatuses.

Another object of the present invention is to provide a novel computer-based method and apparatus for combining a data file with an image file and producing a composite, overlaid, output image, where the image file of the form is stored on the printer and is selectable by an operator of the computer.

Yet another object of the present invention is to provide a printer driver module that unobtrusively augments a standard printer driver so as to be used with commonly used with applications that use the standard printer driver under conventional operating systems, such as the WINDOWS operating system.

Still another object of the present invention is to provide a method and mechanism for encoding forms stored on a hard drive of a printer in an encapsulated PostScript, EPS, format that are callable by a PostScript stream from a PostScript data image file.

A further object of the present invention is to augment a standard printer driver, such as a PostScript printer driver, with a forms overlaying module that enables a PostScript stream from a data image file to call an EPS file stored on a hard disk of a printer without the EPS file adversely changing a graphics or execution state of a PostScript interpreter during execution of the EPS file and without the EPS file being dependent upon any assumed interpreter state.

Another object of the present invention is to provide a method and apparatus that overlays a data image in a PostScript file with an EPS filed saved on a printer mass storage medium and redefines a showpage operation to serve as a no-op (no operation), or other suitable non-printing operation, so as to prevent printing of unwanted pages and clearing of a frame buffer upon execution of a showpage operation occurring in a PostScript stream.

These and other objects are achieved with a form enhancement (or forms overlaying) module that interfaces to a PostScript driver and a forms overlaying utility that stores and manages encapsulated PostScript files of form images on a printer's mass storage device. The method and apparatus also includes combining the data file (data page description) also encoded in the PostScript format with the image file so as to provide a composite output form that is printed from the printer without having to download the form via the computer to the printer each time the form is to be completed. To this end, the inventive method and apparatus includes the forms overlaying module that inserts particular PostScript commands into a print job stream produced by an Adobe PostScript (PS) driver executing the data image file so as to call the EPS form image file from the printer hard disk and correctly combine it with the PS data file for printing.

Because a PS data file may improperly presume a landscape/portrait orientation of the EPS form file, the inventive apparatus and method first detects an orientation of presumed bounding box for storage in the EPS file and rotates the EPS file, if necessary, to make the EPS image orientation consistent with that presumed by the PS data file. To this end, a "clippath" associated with the EPS form image is also translated in a "y" direction to compensate for the rotation operation, when performed, which rotates about a bottom left hand corner of the clippath.

A feature of the present invention is a mechanism that compares offset values in a current transformation matrix to "y" coordinates of a boundingbox defined in EPS image file and substitutes these "y" coordinates of the boundingbox for the offset values, when different. Otherwise, differences between the offset values and the "y" coordinates will induce an offset in position to occur on the printed page between the EPS form image and the data image.

The present method and apparatus also includes a mechanism for ensuring that the form images will not be purged from the printer's mass storage device upon execution of a showpage command. More particularly, the showpage operation is redefined to serve as a "no-op" operator, thereby avoiding a conventional showpage operation from being executed after interpretation of the EPS form page description file.

Furthermore, a feature of the present invention is a graphical user interface that enables an operator to select the above described forms overlaying operations as an extension of the printer utility options in a standard computer operating system, such as WINDOWS.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exemplary form printed on a page, and, in the context of the present invention, corresponds to an Encapsulated PostScript (EPS) form page description file downloaded from a computer and stored on a mass storage device on a printer;

FIG. 2 is a similar image to that shown in FIG. 1, with the addition of a data file overlaid thereon;

DETAILED DESCRIPTION OF THE PREFERRED EMBODIMENTS

Figure 3:
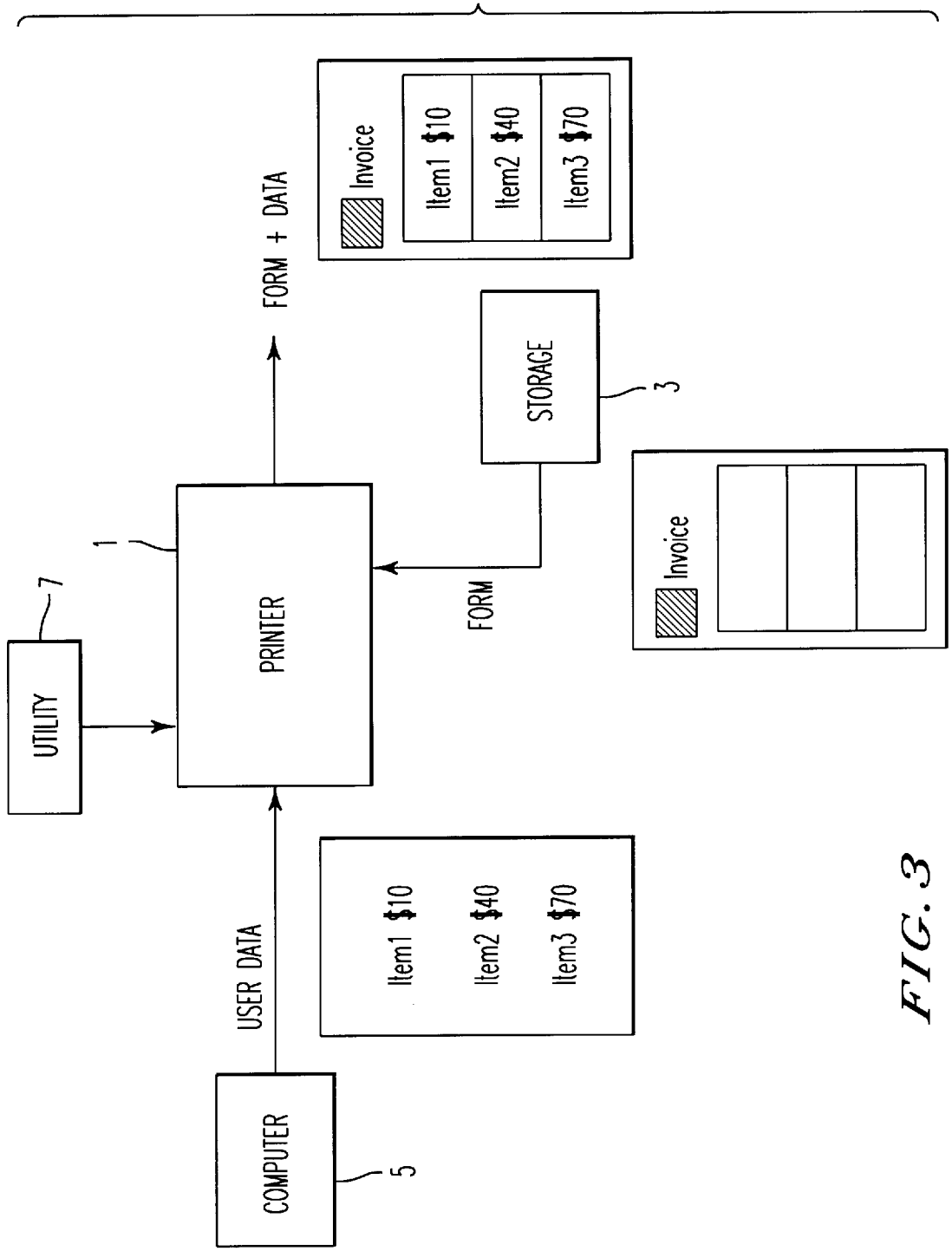
FIG. 3 is a system level block diagram of a computer-based forms overlaying system according to the present invention.

Referring now the drawings, wherein like reference numerals designate identical or corresponding parts throughout the several views, and more particularly to FIG. 3 thereof there is illustrated a block diagram of a computer-based apparatus that implements a form enhancement, overlaying operation using forms stored on a mass storage device 3 of a printer 1, and a data page description downloaded from a computer 5.

FIG. 3 illustrates a PostScript compatible printer, such as model number MP01, available from Ricoh Corporation, appropriately adapted to contain a mass storage device 3 included either internally to the printer 1 or externally thereto. The mass storage device 3 is a magnetic hard disk drive, although an optical disk, semiconductor memory, or the like may be used as well. A personal computer 5, such as a Dell Omniplex GL5 133 using WINDOWS 95 as an operating system, provides user data to the printer 1 by way of a parallel port or alternatively over an Ethernet network using a TCP/IP protocol, for example. Included within a memory of the printer 1, is a utility 7 that cooperates with a utility 61 (FIG. 4) stored in the computer to perform the EPS form page description file download, and file management procedures.

Figure 4:
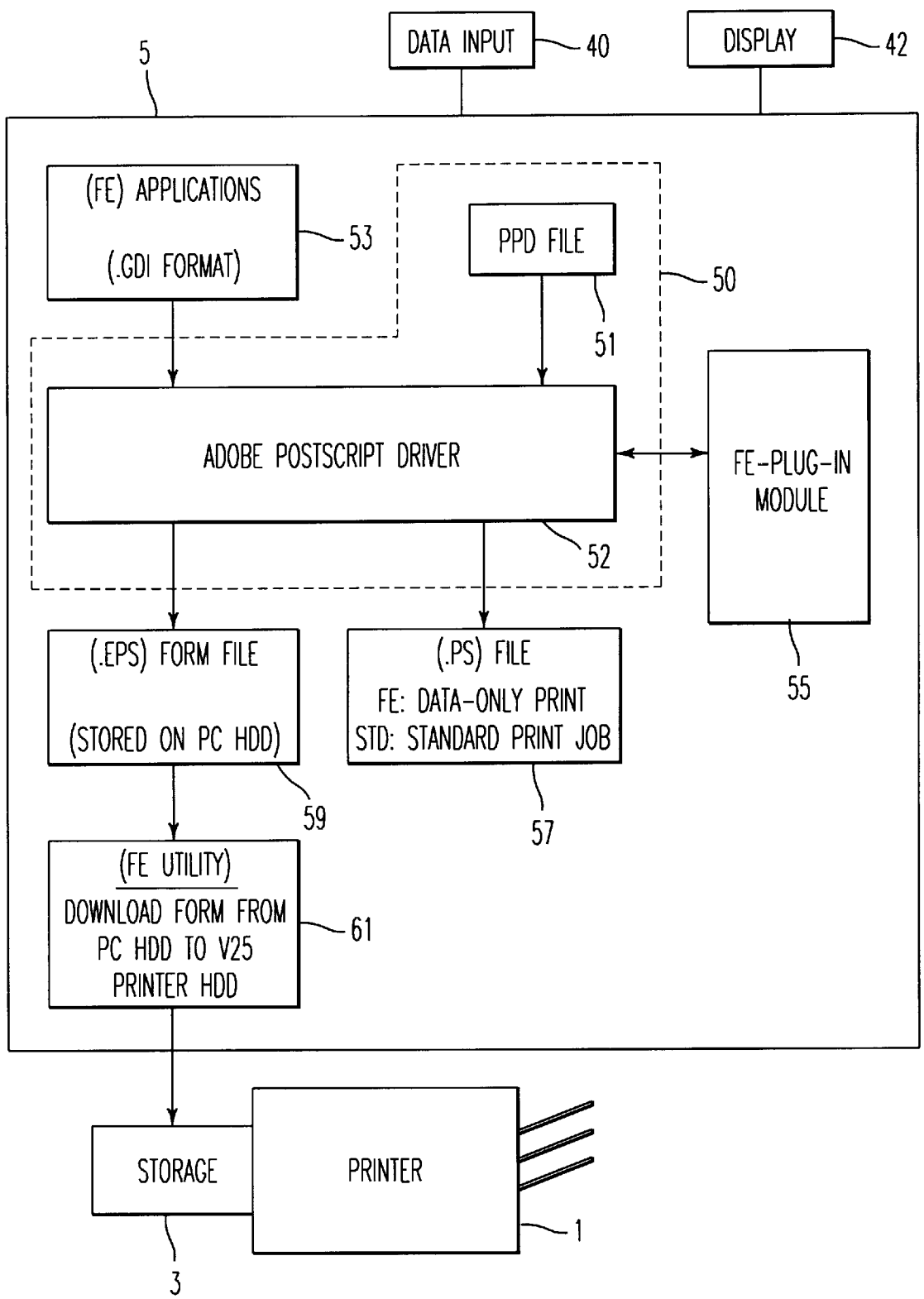
FIG. 4 is a more detailed block diagram than that shown in FIG. 3 and identifies separate mechanisms included within the computer that constitute forms overlaying features of the present invention.

An operation of the apparatus shown in FIG. 3 will first be described at a general level, and a more detailed treatment will be provided in reference to FIG. 4. An image of an invoice (i.e., a type of business form) is stored as an encapsulated PostScript (EPS) file on the storage device 3, after previously having been downloaded to the printer from the computer 5 by the utility 61 (FIG. 4). The image of the invoice corresponds to a blank form without new data, from an end-user, contained thereon. Alternatively, the form may contain subsets of data, such as the operator's name and phone number, for instance to be stored with the form.

When the operator of the computer 5 identifies a particular form (such as that identified in FIG. 1) already encoded in an EPS format, the user selects the form and initiates a print operation for a preselected data page description (identified as "user data" in FIG. 3). In response, a PostScript Driver in the computer 5 emits a stream of PostScript commands, although a forms overlaying (forms enhancement module, element 55 in FIG. 4) intervenes in the generation of the stream at predetermined locations (as will be later discussed) and makes modifications to the stream to enable the selected EPS form page description file stored on the storage device 3 to be called and used thereby, where the modifications are made to avoid disturbing a state of the PostScript interpreter in the printer 1. With respect to the "modifications", only additions are made by the forms overlaying module 55 (FIG. 4) so as to preserve complete compatibility with PostScript capable machines and software applications. These modifications allow the PostScript stream to run the EPS file on the storage device 3 such that the PS data image ("user data", as identified in FIG. 3) is overlaid on the EPS form image ("Invoice", as identified in FIG. 3) when printed by the printer 1 as a composite image ("Form+Data", as identified in FIG. 3).

FIG. 4 is a more detailed block diagram that shows the respective mechanisms, mostly software-based mechanisms, in the computer 5 that provide a way for respective EPS form files to be downloaded to the storage device 3 of the printer 1 and later printed when called by a PostScript stream sent to the printer 1. The computer 5 connects to a data input device 40, such as a printer, mouse or data connector such as a Universal Serial Bus (USB), FireWire, wireless LAN connection or the like. A display 42, such as a cathode ray tube, plasma display, liquid crystal display, or the like, is also connected to the computer 5. Although not shown, the computer includes other input/output mechanisms such as floppy disk drives, optical disk drives, computer network connections, semiconductor memory, data interfaces to scanning device, etc. that may be used as mechanisms for inputting data to the computer 5.

Figure 8:
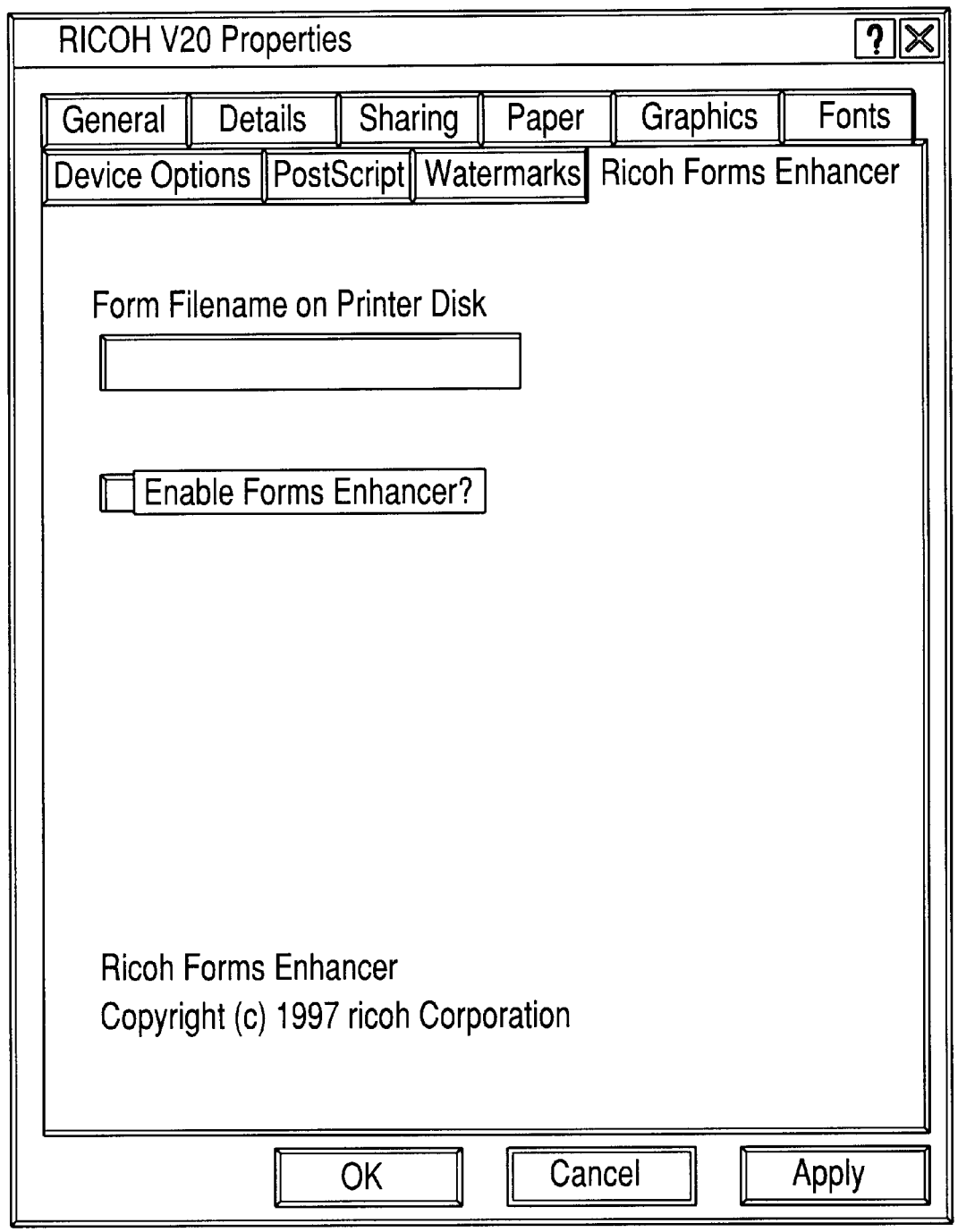
FIG. 8 is a forms overlaying inquiry tab of a printer properties graphical user interface window in which an operator selects an EPS form stored on a mass storage device of a printer for use in printing a form with data overlaid thereon.
Figure 9:
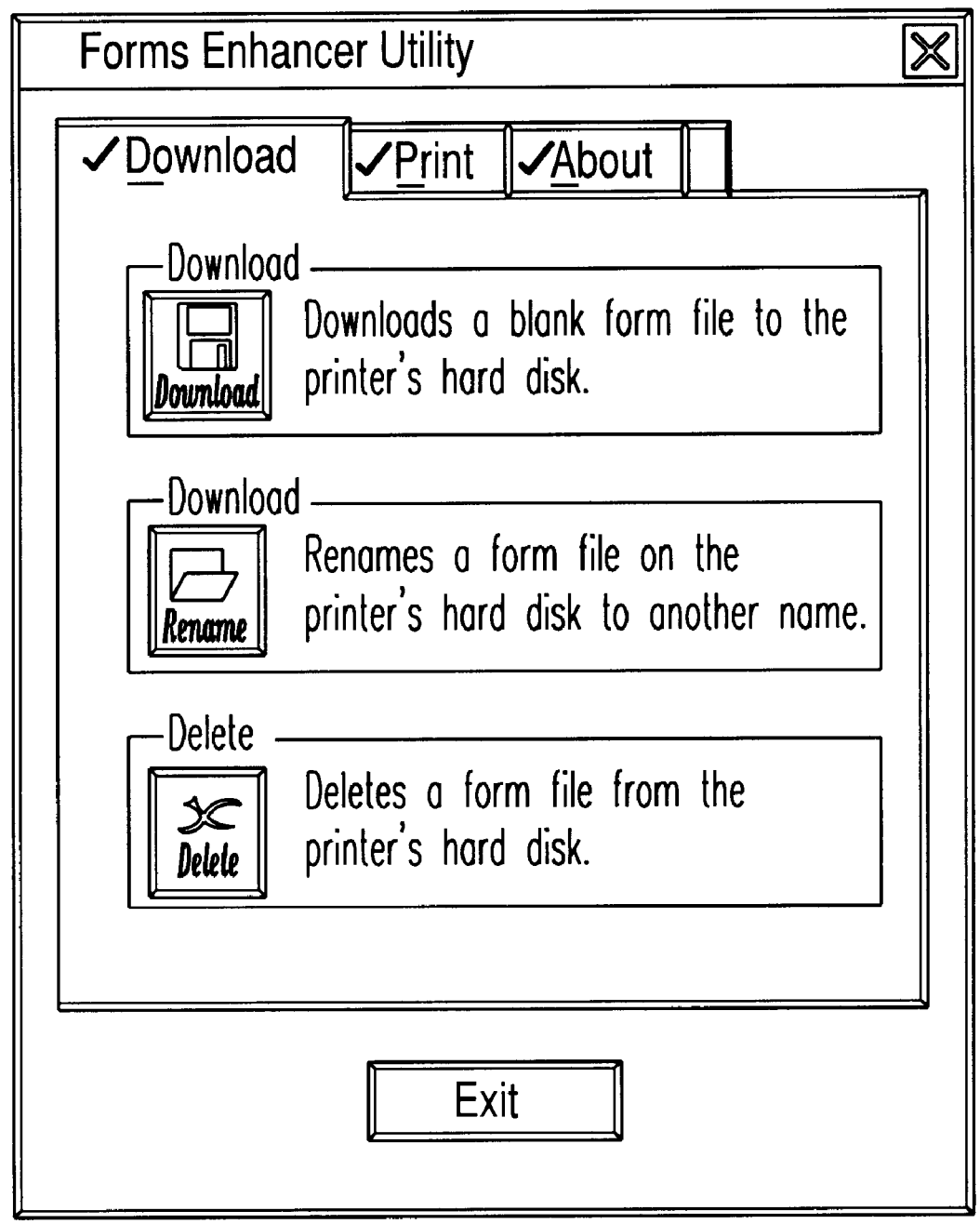
FIG. 9 is a forms overlaying utility window that enables an operator to manage files on the printer's mass storage device.

The computer uses an operating system such as WINDOWS 95, that includes operator-selectable printer property options, as shown in FIG. 8, that appear as a separate, operator selectable tab. Similarly, FIG. 9 shows a Forms Enhance Utility interface window that allows various EPS form page description files to be downloaded, renamed, or deleted from the storage device 3 of the printer 1.

Various applications executed by the computer 5 produce graphics device interface (.GDI) formatted files that are passed to a PostScript driver 50. The PostScript driver 50 converts the respective .GDI files into a stream of PostScript commands, which will ultimately be passed to a PostScript interpreter hosted in the printer 1. Also included in the PostScript driver 50 is a PostScript printer description (PPD) file 51 and a standard PostScript level 2 Adobe PostScript driver 52. The PPD file 51 includes information about printer-specific features and attributes, such as the fonts built into, or stored in, the printer 1, page sizes, printer trays, etc. The standard Adobe PostScript Driver 52 includes an Adobe OEM Plug-in kit, which is the vehicle by which a form overlay (i.e., a form enhancement, FE) plug-in module 55 modifies the PostScript stream when executing the forms overlaying function of the present invention. While the FE plug-in module 55 is shown as being an add-on feature, alternatively the functions performed by the FE plug-in module 55 may be incorporated into the PostScript driver 55 itself In response to user inquiry, the PostScript driver 50 produces a selection option that allows a user to enable or disable the forms overlaying function. More particularly, under a "printer property" window of the operating system, a "Ricoh Forms Enhancer Tab" (like that shown in FIG. 8) is available for selection by a user. This window includes an "Enable Forms Enhancer" option that allows the user to enable and disable the forms overlaying function. If disabled then, then "std" ".PS" files are passed from the PostScript driver 50 to a "(.PS) File" buffer 57 and subsequently to the printer 1, without the FE plug-in module 55 modifying the PostScript stream. Thus, in this case a data page description may be combined with a form image, but both with be drafted as conventional PostScript files (not EPS files) and sent to the printer 1. On the other hand, when the operator enables the forms overlaying operation, only the data page description (after having selected PostScript commands added by way of the FE plug-in module 55) is sent to the "(.PS) File" buffer 57 and when called thereby the EPS form page description file is retrieved from the printer's storage device 3, without being separately downloaded from the computer 5 to the printer 1.

The form file mechanism 59, is a utility that enables users to generate a form and convert the form into an EPS file format for storage on the printer's storage device 3. More particularly, the user creates a form using software such as Omni Form, offered by Caere, Form Tool 97, offered by IMSI, In-Power Forms, offered by Think Stream, Key Form, offered by Softkey, or Trans Forms, offered by MIPS, for example. Once generated, if the form-making software does not offer a mechanism for converting the form into an EPS file, then the EPS form file mechanism 59 instructs the user to select the "properties" menu of the "file" menu of the "printer" menu and select the encapsulated PostScript output file format option. Subsequently, in a print dialogue box the operator is prompted to print to file the new form (in EPS format) and then prompted to give the file name that can be later used to retrieve the form from the printer's storage device 3.

Subsequently, the download form utility 61 prompts the user to query which of the respective forms are to be downloaded to the storage device 3. The storage device 3 serves as a repository for the various forms that are downloaded thereto and the total number of files is determined by an amount of available space on the storage device 3. In the event that the storage device 3 becomes full, newly downloaded form files are not saved and a warning message is displayed on the display 42. Alternatively, the user is prompted in reply to the recognition of the unavailability of space, so that the user may identify files on the storage device that may be erased so as to create sufficient room for the new file.

Figure 5A:
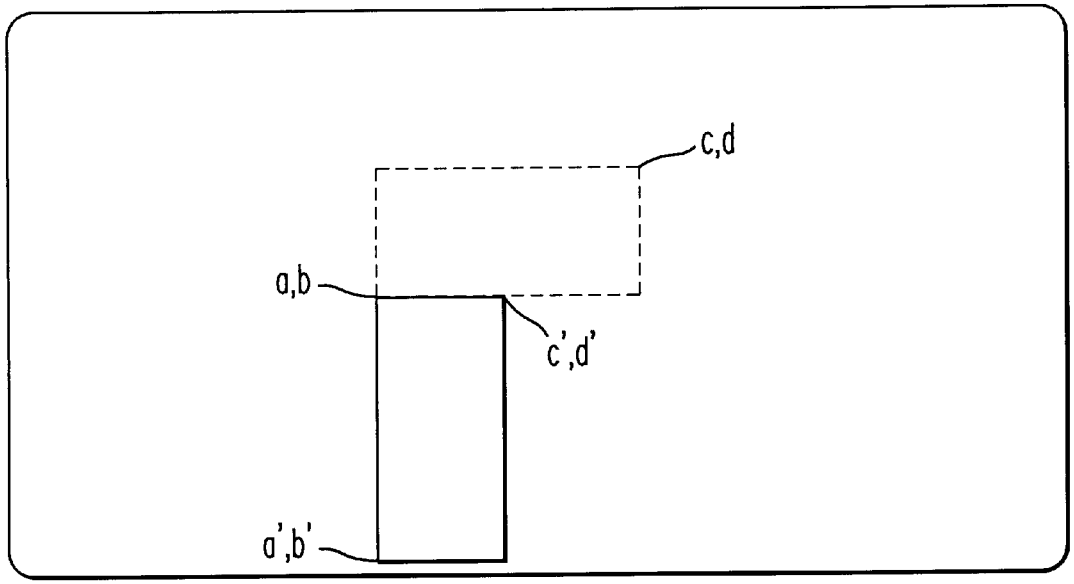
FIGS. 5A and 5B are respective diagrams showing orientation and origin offset errors in the EPS form page description file.

When implementing the present forms overlaying mechanism, several implementation problems were identified and solutions to such problems were also identified, as explained below. First, a problem was discovered in how to orient the EPS form in a manner consistent with the FS data page description that called the EPS form. Because the EPS form is prepared independent of a particular calling file, it is desirable to orient the respective EPS form images in a consistent manner (i.e., consistently portrait or consistently landscape) so that a calling file will know whether or not to rotate the EPS form image used in the particular form overlaying application. Moreover, some calling programs may want the EPS form image to be in a landscape orientation, and others may want the EPS file to be in a portrait orientation. Thus, if by convention the EPS files are always saved in a portrait setting, then the calling file will know, a priori, whether the EPS file must be rotated, or not, in order to match the data image. In order for the file enhancer utility 61 (FIG. 4) to know whether to rotate the image, the bottom left and upper right coordinates a boundingbox (or clippath) are first identified, namely a, b and c and d, corresponding to llx (lower left x), lly (lower left y) and urx (upper right x), ury (upper right y) coordinates. FIG. 5A illustrates such a bounding box, as identified by a dashed line, where a, b define the bottom left coordinate, and c, d define the upper right coordinate. To determine whether the boundingbox must be rotated, a comparison is made to determine if c>d. If this condition is not satisfied, the orientation of the image is not changed. However, if c>d, then the x component of the upper right coordinate is greater than the y component of the upper right coordinate, indicating that the form image is oriented in a landscape setting and indicating that a 90° rotation operation should be performed on the image. The rotation operation rotates the image about the bottom left-hand corner, which offsets the image in "y" direction relative to the page, as shown in FIG. 5A. Accordingly, in order to readjust the image in the "y" direction, a translation operation is performed before the rotate operation (although it may also be performed after the rotation operation), where the amount of rotation is set to be the sum of the two y coordinates (b+d). Thus, when it is determined that a rotation operation is required, the following two operations are performed on the EPS form page description file:

| (b + d) | 0 | translate |
| 90 | | rotate |

Figure 6:
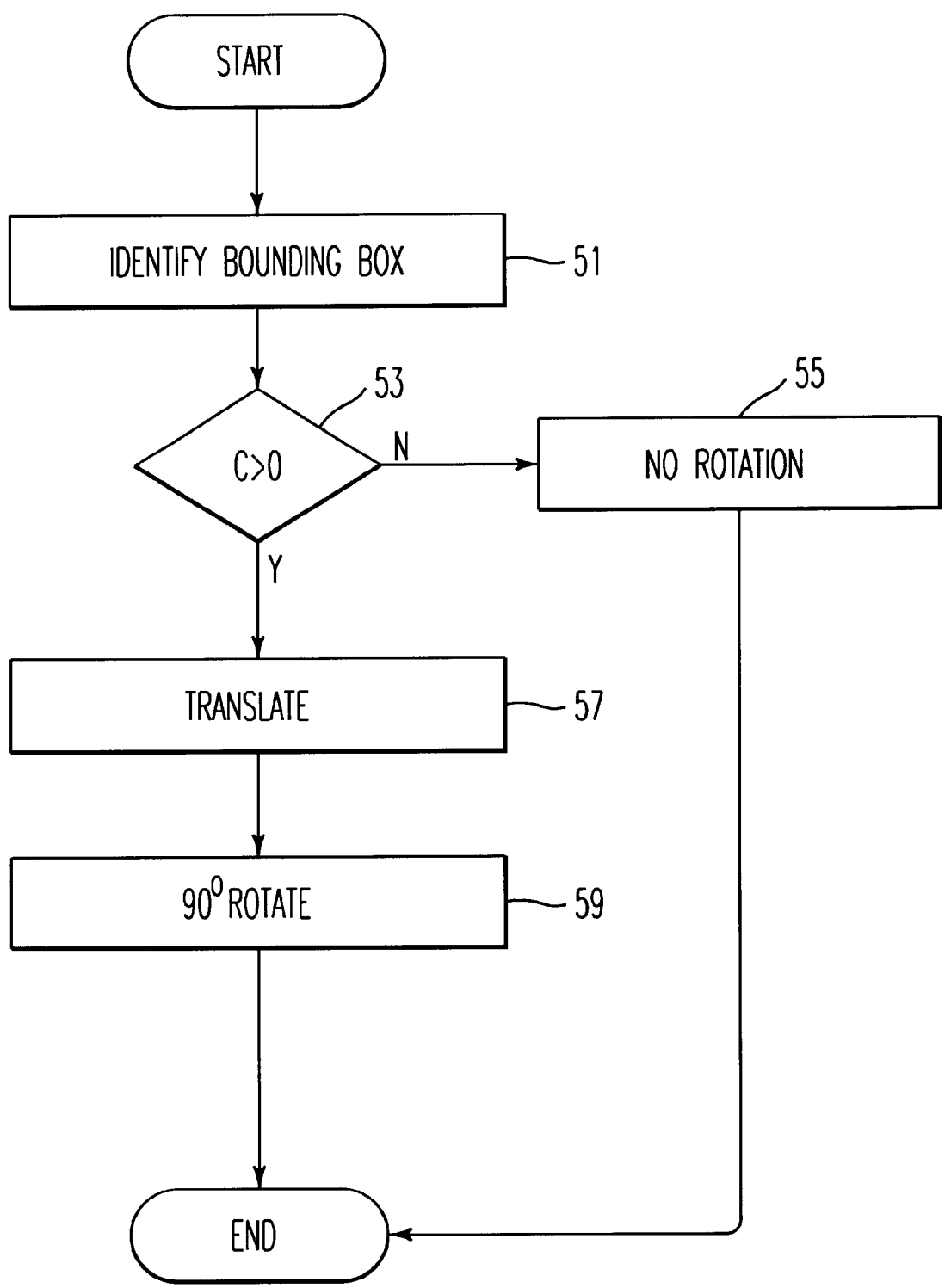
FIG. 6 is a flowchart of a process for detecting and, if necessary, translating and rotating the EPS form image in order to align properly with the PS data file, consistent with either a portrait or landscape setting as determined by the PS data file.

FIG. 6 is a flowchart identifying a method for identifying whether the EPS form image needs to be rotated and translated. The process beings in step S1 where the boundingbox is identified for the EPS form image. In particular, the coordinates used to define the upper right corner of the boundingbox are identified. The process then proceeds to step S3 where the value associated with coordinated c is compared with value associated with the coordinate d so as to determine whether c is greater than d. If the response in step S3 is negative, then in step S5 it is determined that no rotation is necessary and the process ends. However, if the response in step S3 is affirmative, the process flows to step S7 where the translation operation is performed, followed by step S9 which performs the 90° rotation operation. Subsequently, the process ends.

Figure 5B:
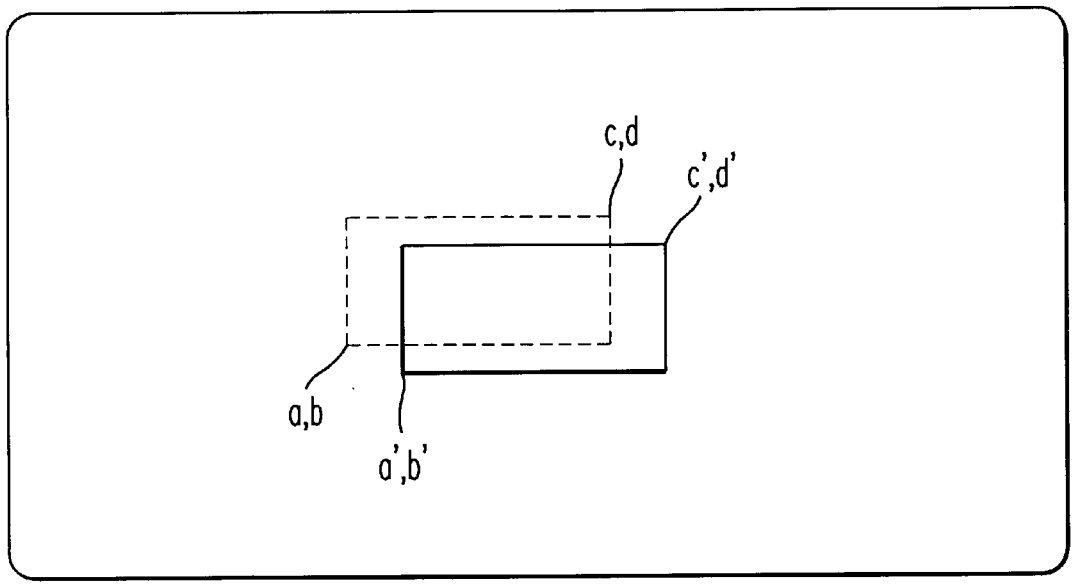

Another problem that was discovered, and ultimately corrected, was that the offset variables in the transformation matrix defined by the Adobe PostScript driver 52 are defined in an inconsistent format with that used to define the boundingbox coordinates of the EPS file. In particular, the offset variables in the transformation matrix (as identified in a PostScript driver naming convention such as "/mysetup") are defined in a real format, while the boundingbox coordinates are defined in an integer format. For example, in one exemplary case, a boundingbox was defined to have b and d coordinates with integer values of 13 and 780, but the offset values in the transformation matrix were observed to have values of 12.96 and 778.92, respectively. As a consequence, and as illustrated in FIG. 5B, an offset was observed between the EPS form page description file and the PS data page description. Thus, the data image did not precisely match the form image.

In recognition of this problem, it was determined that the undesired offset could be overcome by substituting the b and d bounding box coordinates for the offset values of the current transformation matrix. By making this substitution the EPS form file would align properly with the data page description when the composite image was formed.

Figure 7:
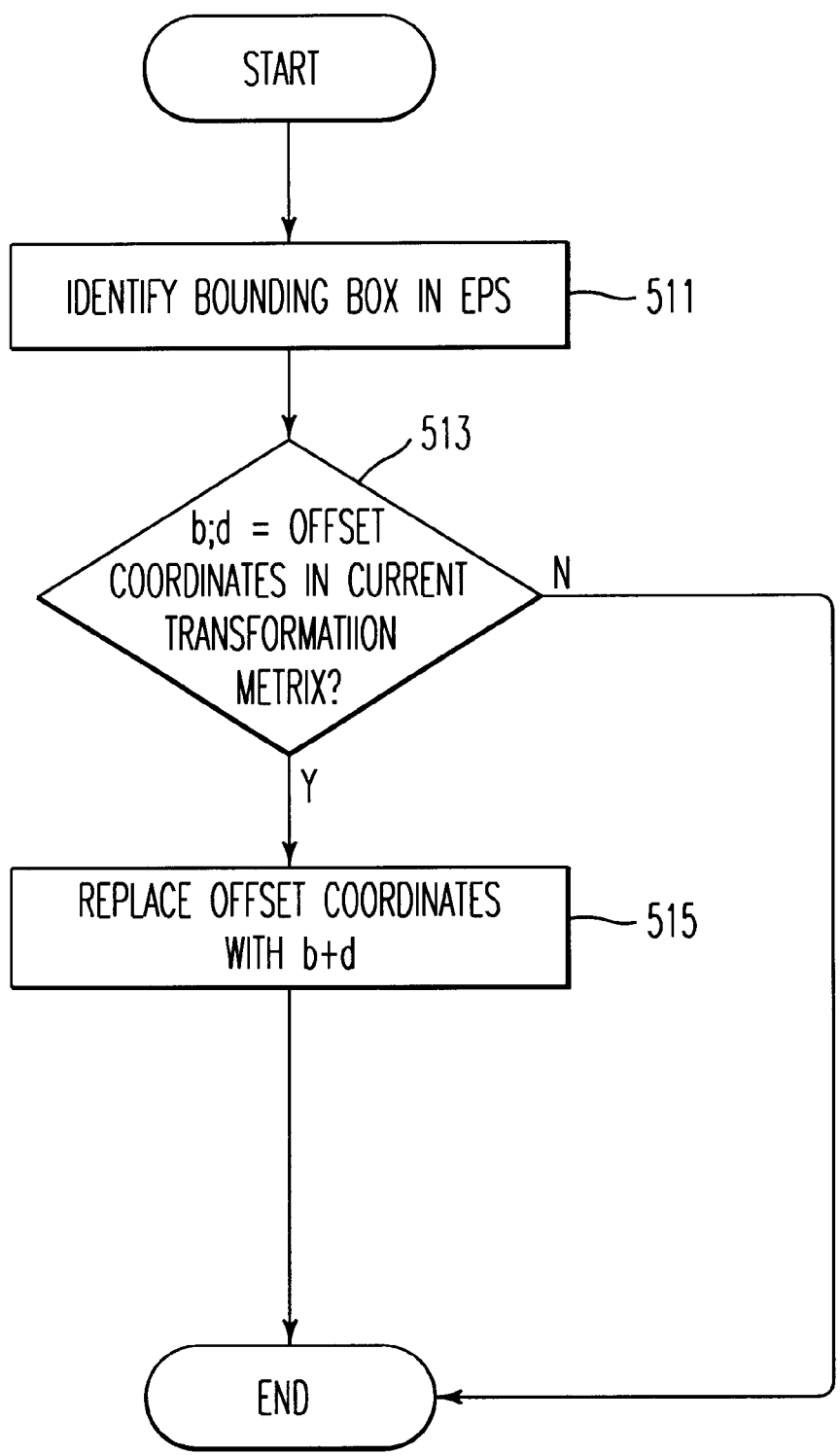
FIG. 7 is a flowchart of a process for changing an origin of the EPS form image to be consistent with an origin of a current transformation matrix.

FIG. 7 is flowchart of a process for detecting whether an offset occurs between the origin of the boundingbox and the current transformation matrix, and correcting the offset if present. The process beings in step S11 where the boundingbox and the coordinates contained therein are identified. Once identified, the process proceeds to step S13 where at least one of the coordinates b and d is compared with a corresponding offset coordinate in the current transformation matrix. If the result of the inquiry in step S13 is negative, the respective coordinates are equal, and the process ends. However, if the respective coordinates are different from one another, the offset coordinates in the current transformation matrix are replaced by the corresponding boundingbox coordinates (i.e., b and d).

Aside from the above-described problems and solutions related to the forms overlaying utility 61 (FIG. 4), several issues arise as a result of employing the EPS form page description file (e.g., a form template) on the printer's storage device 3, that would be easily callable from the data image PostScript stream produced by the combination of the Adobe PostScript Driver 52 and the FE-Plug-In Module 55. More particularly, the present inventors have identified the importance of minimizing the amount of changes to the PostScript page description and the importance of modifying the PostScript stream at locations where OEM defined portions of the printer driver can intervene.

At risk is the EPS form image in the printer's frame buffer creating residual state changes that inadvertently disturb a graphics and execution state of the printer's PostScript interpreter. To this end, by saving the form image in an EPS format (versus a custom format or a PCL format, for example), and inserting PostScript code via the FE-Plug-In Module 55 at predetermined locations, a significant amount of protection against state changes to the interpreter during the image data execution is gained, and is a severance of a dependency of the EPS form page description file on an assumed interpreter state is obtained. Thus, the selection of an EPS format to hold the form file is compatible with the PostScript printer language, and helps to ensure stable, PostScript-compatible operation.

The point at which code is inserted by FE-Plug-In Module 55 into the driver's PostScript stream is relevant to the present forms overlaying function being completely compatible with PostScript compatible software applications and PostScript compatible equipment. It is preferable that the code be inserted into the PostScript stream from the standard Adobe PostScript Driver in two precise locations: a first location being for an insertion of the setup code for the entire job and the second location being for a causation of the execution of the form overlay from the printer's storage device for each page.

The first insertion point, or location, is selected so that the clip area of the page to be printed is established. This requires that the page device be established for the tray and page size in question before the clip path is evaluated. To this end, in the present embodiment, the chosen point is at the last element of the Page Prolog emitted by the standard PostScript printer driver.

The second insertion point recurs on a per-page basis, where, generally the insertion for pages after the first is relatively easy to determine, however, the first page is tricky. This is due to the tendency for drivers to emit a large amount of page oriented setup code directly before the first page, as is observed by the present inventors. The form overlay operation is thus preferably executed at a point where anything which would clear the imageable area has already executed, where the graphics state is same and the intended page device is installed. To this end, in the present embodiment, the chosen point is at the end of the Page Setup and before where the Page Resources are emitted.

Regarding state manipulation, when the form overlay is executed from the printer's storage media, there are two aspects of state which are to be manipulated. First, the present interpreter state is preserved and next a new, relatively pristine, state is constructed for the execution of the form overlay on the storage device. The save operator is used to preserve the graphics and VM state and a new transformation matrix is installed so that there will be no scaling or translation side effects. The previous matrix, VM state and graphics state are restored using the restore operator and other matrix manipulation operators.

In order to properly report errors to the operator during form overlay execution the present inventors determined that placing error handling code in-line would most efficiently accomplish this task. The drive plug-in module inserts an error handling routine which is invoked if an error is encountered during execution of the form from the disk. This is accomplished using a PostScript stopped context to trap errors and then alternative PostScript code is executed during an error condition to generate an error report on the printed material.

A presently recognized problem is the execution of "showpage" operations after completion of the interpretation of form. Executing a showpage operation after completing an interpretation of the form, will have several negative consequences such as printing unwanted pages and clearing a frame buffer. Because the present forms overlaying invention is transportable between PostScript compatible devices, it is not practical to eliminate the showpage operator from the PostScript stream.

In light of this problem, the present inventors recognized that the showpage operator may be redefined to be a non-operation (i.e., a "no-op"). The redefinition of the showpage operation is done when the downloaded image form is recalled so as to allow for any special pre-processing which may be done or application dependencies. One mechanism for making the showpage operation less intrusive is to redefine the showpage operation as a no-op is by using the following character string:

/showpage { } def.

While the previously cited, Adobe PostScript Language Reference Manual recognizes that the showpage operator may be redefined using a redefinition character string like that defined above, (see, e.g. page 719 of "PostScript Language Reference Manual Second Edition"), this description is made under the presumption the showpage operator will contain a parameter between the brackets. In contrast to this approach, the present inventors have purposely redefined the showpage operator with no parameter between the brackets so that the showpage operation will perform the equivalent function of a no-op.

One example of where to employ this redefinition of the showpage operator is shown below and should be added to the front of any file to be downloaded to the printer's storage device 3:

```
/filename (demoform.eps) def
/readh currentfile def
/writeh filename (w) file def
/str 2000 string def
/doit
{
  {
    readh str readstring not /done exch def
    writeh exch writestring
    done {exit} if
  }
  loop
  writeh closefile
} def
doit
% Line added to redefine showpage
/showpage {} def
```

In the above example, a first part of the code causes everything after the operator "doit" to be downloaded to the storage device 3 on the printer 1 (FIG. 4). The second part of the above code redefines the showpage operator as previously discussed.

An initialization code string is employed as a set up portion to be emitted after a standard driver header, but before the PostScript file associated with the data to be included on the form. The following code replaces a setup portion to be emitted after a standard driver header for a form on the disk named 'kristen.eps':

```
%Ricoh Form Overlay Header Begin (kristen)
/FormOverlay << /FormType 1 /BBox [ clippath pathbbox ]
   /Matrix[1.0 0 0 1.0 0 0 ]
   /Paint Proc { pop /FormOverlaySaveObj save def
   {(UserForm/kristen.eps)run} stopped
         {
         /Times-Roman 24 selectfont 100 600
         moveto (Form Overlay Error: ) show
         /___s 100 string def $error dup /errorname get ___s cvs show
         /100 570 moveto (Offending Command: ) show
         /command get ___s cvs show
         100 540 moveto (Form Filename: kristen.eps) show
         } if
   clear FormOverlaySaveObj restore } bind
>> def
/FormOverlayExec {
   /FormOverlayMTX 6 array currentmatrix def
   initmatrix FormOverlay execform
   FormOverlayMTX setmatrix
} bind def
end
% Ricoh Form Overlay Header End
```

The above code describes how a form dictionary is set up such that the form dictionary may be used to reproduce the image form. Note that the PaintProc operation calls out the form file downloaded in the above described example and runs it with the appropriate save and restore operations.

The next portion of code is inserted as a string at the beginning of each page:

FormOverlayExec

The above described string executes the form represented by the form dictionary bound to the name "FormOverlay" defined in the above described initialization code. The execution of the form will not change the state of the interpreter, owing to the saves and restores as well as the definition and implementation of the execform operator.

Experiments using the present form enhancement show significant improvement in download time. More particularly, samples files generated using OmniForm were used to make a typical invoice form with moderate graphics image content. A first file, shown below, is an output of form and data, and the second file is an output of data only.

FORMDATA PS 97,842 06-13-96 6:54p formdata.ps

DATAONLY PS 18,812 06-13-96 6:54p dataonly.ps

During the experiment it was assumed that the Form+Data equaled 100 k, and the Data only equaled 20 k. The observed results are shown in Tables 1 and 2.

TABLE 1

Downloading form over Centronics Parallel Link
Typical Centronics Speed 100 k/sec
Average Disk Transfer 1 MB/sec

|  | Centronics | Printer's Disk Access | Total Time | Relative PPM |
|---|---|---|---|---|
| OmniForm Without Form-Overlay | 1000 ms |  | 1000 ms | X ppm |
| OmniForm With Form Overlay | 100 ms | 100 ms | 200 ms | X + 4 ppm |

TABLE 2

Downloading form over TCP/IP
Typical LAN Speed 100 k/sec
Average Disk Transfer 1 MB/sec

|  | LAN (TCP/IP) | Printer's Disk Access | Total Time | Relative PPM |
|---|---|---|---|---|
| OmniForm Without Form-Overlay | 1000 ms |  | 1000 ms | X ppm |
| OmniForm With Form Overlay | 100 ms | 100 ms | 200 ms | X + 4 ppm |

Aside from the above described advantages, by storing the forms on a mass storage device, the forms are not lost when a power outage is observed.

The processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. The storage medium can include, but is not limited to, any type of disk including floppy disk, optical disk, CD-ROMS, and magneto-optical disks, ROMS, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for overlaying a data image contained in a PostScript data file on a form image contained in an encapsulated PostScript file, comprising the steps of:

storing the form image in the encapsulated PostScript file on a storage device of a printer;

sending the PostScript data file to the printer which causes the encapsulated PostScript file to be interpreted with the PostScript data file;

determining whether an orientation of the form image in the encapsulated PostScript file is common to a predetermined orientation;

reorienting the form image in the encapsulated PostScript file if it is determined in the determining step that the form image in the encapsulated PostScript file is not common to the predetermined orientation; and printing a composite page having the data image from said PostScript data file overlaid on the form image from said encapsulated PostScript file.

2. The method of claim 1, further comprising the step of redefining a showpage operation to perform a no-operation.

3. An apparatus for overlaying a data image contained in a PostScript data file on a form image contained in an encapsulated PostScript file, comprising:

means for storing the form image in the encapsulated PostScript file on a storage device of a printer;

means for sending the PostScript data file to the printer and causing the encapsulated PostScript file to be interpreted with the PostScript data file;

means for determining whether an orientation of the form image in the encapsulated PostScript file is common to a predetermined orientation;

means for reorienting the form image in the encapsulated PostScript file if it is determined by the means for determining that the form image in the encapsulated PostScript file is not common to the predetermined orientation; and means for printing a composite page having the data image overlaid on the form image.

4. The apparatus of claim 3, further comprising:

means for redefining a showpage operation to perform a no-operation.

5. An apparatus for overlaying a data image contained in a PostScript data file on a form image contained in an encapsulated PostScript file, comprising:

a processor; and a computer readable medium encoded with processor readable instructions that when executed by the processor implement, a form image storing mechanism configured to store a form image on a memory of a printer as an encapsulated PostScript file, an orientation correction mechanism configured to determine whether an orientation of the encapsulated PostScript file is common to a predetermined orientation, and to rotate the encapsulated PostScript file if it is determined that the encapsulated PostScript file is not commonly oriented with the predetermined orientation, and a data file printing mechanism configured to send a PostScript data file to a printer and cause the encapsulated PostScript file stored on the memory of the printer to be interpreted with the data file.

6. The apparatus of claim 5, wherein:

said computer readable medium is further encoded with processor readable instructions that when executed by the processor further implements, a showpage redefinition mechanism that redefines a PostScript showpage operation to perform a no-operation command.

7. A method for overlaying a data image contained in a PostScript data file on a form image contained in an encapsulated PostScript file, comprising the steps of:

storing the form image in the encapsulated PostScript file on a storage device of a printer;

sending the PostScript data file to the printer which causes the encapsulated PostScript file to be interpreted with the PostScript data file;

adjusting an origin of at least one of the encapsulated PostScript file and a transformation matrix so as to provide a common origin for both the encapsulated PostScript file and the transformation matrix, and printing a composite page having the data image from said PostScript data file overlaid on the form image from said encapsulated PostScript file.

8. An apparatus for overlaying a data image contained in a PostScript data file on a form image contained in an encapsulated PostScript file, comprising:

means for storing the form image in the encapsulated PostScript file on a storage device of a printer;

means for sending the PostScript data file to the printer and causing the encapsulated PostScript file to be interpreted with the PostScript data file;

means for adjusting an origin of at least one of the encapsulated PostScript file and a transformation matrix so as to provide a common origin for both the encapsulated PostScript file and the transformation matrix; and means for printing a composite page having the data image overlaid on the form image.

9. An apparatus for overlaying a data image contained in a PostScript data file on a form image contained in an encapsulated PostScript file, comprising:

a processor; and a computer readable medium encoded with processor readable instructions that when executed by the processor implement, a form image storing mechanism configured to store a form image on a memory of a printer as an encapsulated PostScript file, a translation mechanism configured to adjust an origin of at least one of the encapsulated PostScript file and a transformation matrix so as to provide a common origin for both the encapsulated PostScript file and the transformation matrix, a data file printing mechanism configured to send a PostScript data file to a printer and cause the encapsulated PostScript file stored on the memory of the printer to be interpreted with the data file.

* * * * *